Patented Dec. 31, 1946

2,413,656

UNITED STATES PATENT OFFICE 2,413,656

ALPHA - (META - HYDROXYPHENYL) - BETA-METHYLAMINOETHANOL PARA - AMINOBENZOATE

Melville Sahyun and John A. Faust, Detroit, Mich., assignors to Sterling Drug Inc., New York, N. Y., a corporation of Delaware No Drawing. Application April 4, 1945,
Serial No. 586,643

1 Claim. (Cl. 260—472)

The present invention is concerned with a new chemical compound particularly useful as a vasoconstrictor.

It has been recognized for over fifteen years that alpha-(meta-hydroxyphenyl) beta-methylaminoethanol possesses the property of causing constriction of the blood vessels, particularly the mucosa. The compound has been marketed widely in the United States and foreign countries as a mineral acid salt, such as hydrochloride salt, in dilute aqueous solution. Due to the inherent instability of the amine and the low pH of the compound in aqueous solution, it has been necessary to utilize various stabilizers and buffering agents to produce compositions which are resistant to light and do not sting in the nasal passages. Efforts thus to overcome the shortcomings of the hydrochloride salt of the compound have not produced entirely satisfactory results.

We have worked with the compound over a period of many years and had been familiar with the problems and difficulties inuring to the sale and use of the material. It suddenly occurred to us to try to make an organic acid salt of the amine which might be crystalline and therefore obtainable in a highly purified form, be self-buffering at about pH 7, or neutrality, to eliminate sting in use, inherently stable in aqueous solution against light and oxidation or carbonation, while retaining its therapeutic effectiveness. After repeated attempts to obtain a compound meeting these requirements, using many different mono- and poly- carboxylic acids, we finally succeeded in obtaining four compounds, of which the compound herein described and claimed is one, that satisfactorily met the above specifications.

The new compound, alpha-(meta-hydroxyphenyl)-beta-methylaminoethanol p-aminobenzoate, may be prepared by mixing the amine with aqueous p-aminobenzoic acid in approximately equimolecular amounts at room temperature or somewhat elevated temperatures, concentrating under reduced pressure to an oily liquid and then drying by any convenient process as by distilling the same with an alcohol under reduced pressure or in vacuo over a suitable drying agent such as calcium chloride. The compound may then be purified by recrystallization from a suitable alcohol such as 99% isopropyl alcohol.

The new compound is yellow, crystalline substance having a melting point of 170 degrees–171 degrees centigrade.

The preparation of this compound is illustrated by the following example:

A dry mixture of four grams of alpha-metahydroxyphenyl-beta-methylaminoethanol and 3.28 grams of paraminobenzoic acid was dissolved in 25 milliliters of warm distilled water and the resulting solution concentrated under reduced pressure to an oily liquid. This liquid was dried by isopropyl alcohol distillation under reduced pressure. The residual oil remaining after the removal of the isopropyl was triturated with absolute ethyl alcohol whereupon it became crystalline. These crystals were then recrystallized from 99% isopropyl alcohol to purify them. The compound thus prepared was analyzed for nitrogen and the percentage found was 9.24 per cent, the theory being 9.21 per cent.

The compound is self-buffering to yield an approximately neutral (pH 6.6 in one-quarter per cent) aqueous solution, resistant to light and oxidation, and suitable for use as a vasoconstrictor.

We claim:

Alpha-(meta-hydroxyphenyl) - beta - methyl - aminoethanol para-aminobenzoate.

MELVILLE SAHYUN.
JOHN A. FAUST.